3 Sheets--Sheet 1

H. A. LYMAN.

Corsets.

No. 6,100. Reissued Oct. 27, 1874.

Witnesses:
Thos R Sinclaire
J. P. S. Goodwin

William S. Thomson
Chas. H. Langdon
Geo. C. Batchelder
Assignees of Henry A. Lyman
by M. M. Gillespie
their Attorney 3 Sheets--Sheet 2.

H. A. LYMAN.

Corsets.

No. 6,100. Reissued Oct. 27, 1874.

Witnesses:

Thos. R. Lambert

H. Blandy

William L. Thomson
Chas. H. Langdon
Geo. C. Batchelder
Assignees of Henry A. Lyman
by M. M. Spencer
their Attorney

H. A. LYMAN.

Corsets.

No. 6,100. Reissued Oct. 27, 1874.

William S. Thomson
Chas. A. Langdon
Geo. C. Batchelder
Assignees of Henry A. Lyman
by M. M. Livingston
their Attorney Witnesses:
Thos. Sinclair
H. Handy

UNITED STATES PATENT OFFICE.

HENRY A. LYMAN, OF LONDON, ENGLAND, ASSIGNOR TO THOMSON, LANGDON & CO., OF NEW YORK CITY.

IMPROVEMENT IN CORSETS.

Specification forming part of Letters Patent No. 97,418, dated November 30, 1869; reissue No. 6,100, dated October 27, 1874; application filed April 3, 1872

*To all whom it may concern:*

Be it known that HENRY ALEXANDER LYMAN, of Cheapside, in the city of London, England, heretofore invented a new and useful Improvement in Stays and Corsets, for which Letters Patent of the United States, No. 97,418, were, on the 30th day of November, 1869, issued to the firm of THOMSON, LANGDON & Co., of New York city, as assignees; and we, the undersigned, now composing that firm, hereby declare that the following is a full, clear and exact description of the said improvement, reference being had to the drawings, which accompany and form a part of this specification.

Figure 1:
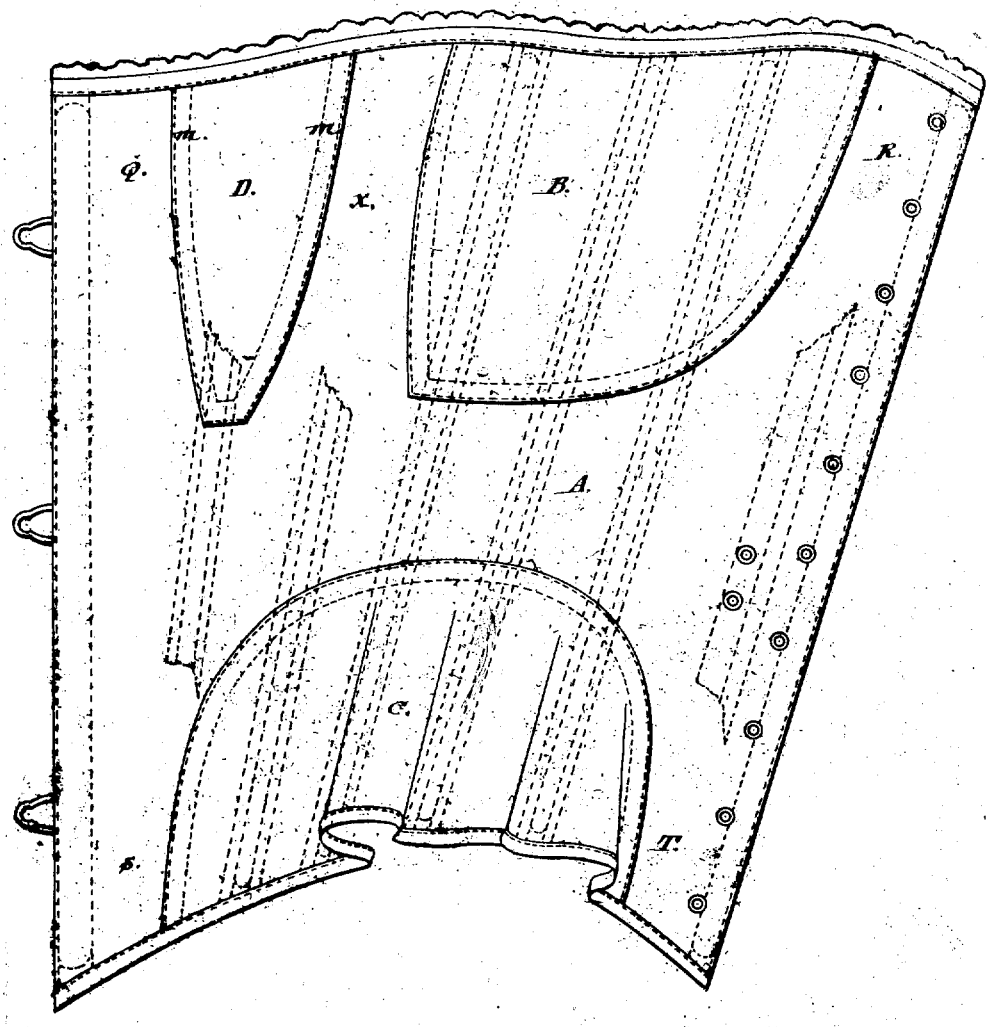
Figure 2:
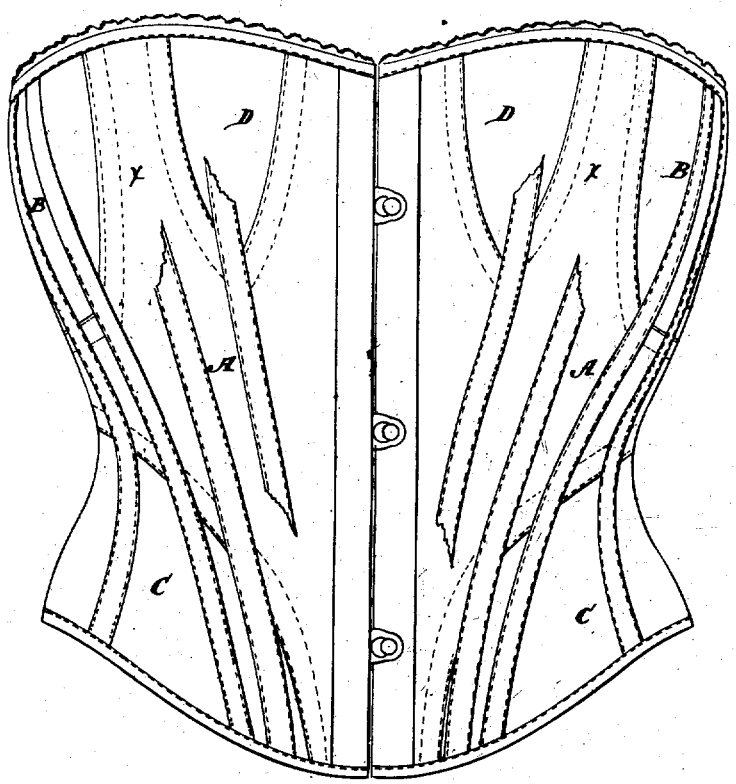
Figure 3:
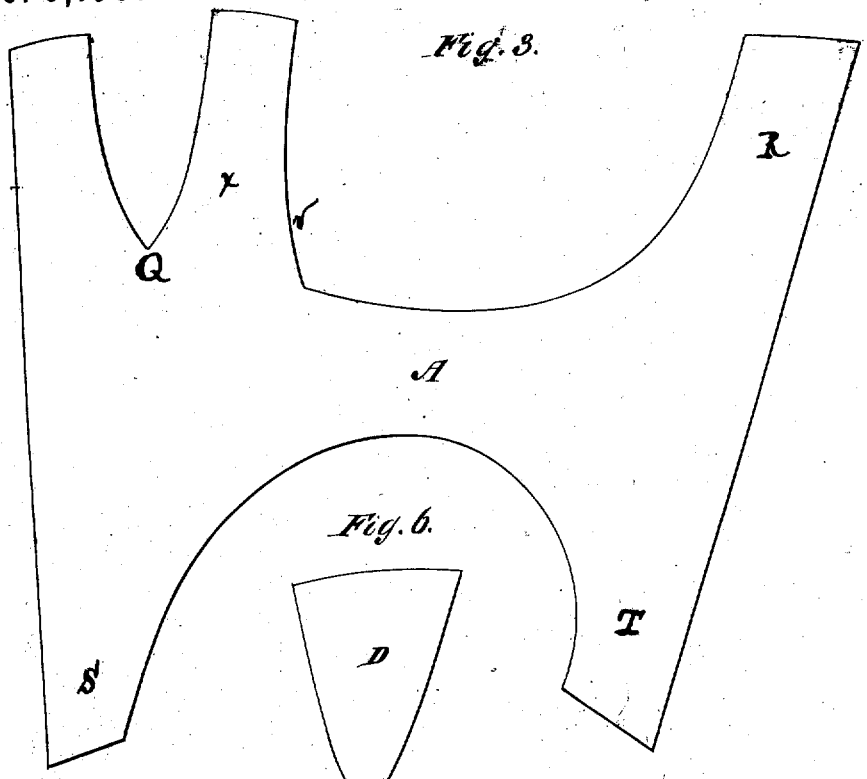
Figure 6:
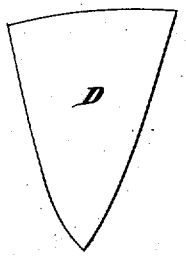
Figure 4:
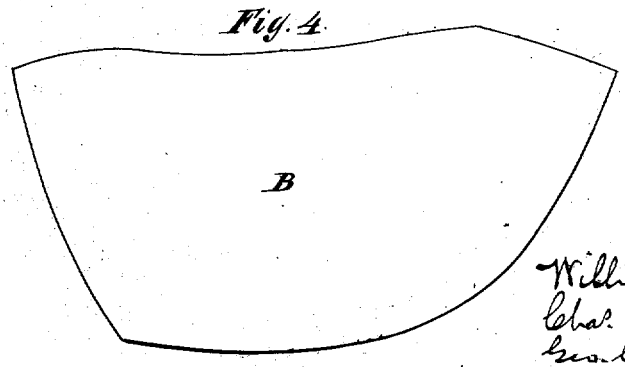
Figure 5:
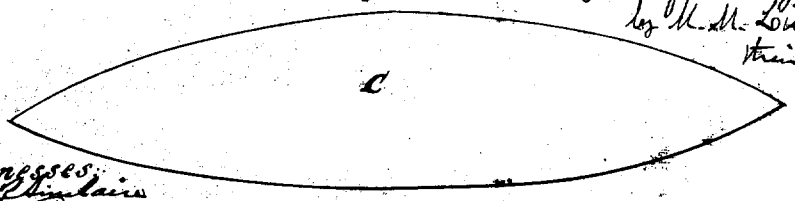

Of these drawings, Figure 1 represents the under side of one-half of the said LYMAN'S improved corset laid out flat. It is made to exhibit very plainly the parts Q, R, S, T, and $x'$, which will be hereinafter referred to. Fig. 2 is a front view of the complete corset. Figs. 3, 4, and 5 represent in detail the chief pieces or sections of which each half of the corset is composed. Fig. 6 represents one of the gore pieces. In Figs. 1 and 2, some of the ribs of the corset are somewhat broken out to show the parts more clearly.

This invention relates to an improvement upon the stays and corsets described in the Letters Patent of the United States, No. 64,530, granted May 7, 1867, to Edward Drucker. The novelty in that invention consisted in reconstructing that class of corsets in which the usual gores are dispensed with, by causing the seams uniting the different parts of the corset to run transversely instead of up and down, and in forming the corset of two or more sections, united by an intermediate zone-like or bodice-shaped section, which is made to present a wider space between the seams toward the front and back of the corset than at other points. This will be fully understood by reference to the Drucker patent. This mode of making a corset not only secures, to an important extent, the requisite fullness, but it also has the merit of simplicity; and it prevents the tension or strain produced on the corset when it is laced from being thrown entirely on the stitching, as was previously the case, and enables the material of the intermediate zone-like section to receive the strain. These advantages of the Drucker corset have proved to be very great.

In order to retain them, and at the same time to still further improve the corset by enabling it to adapt itself at every point more closely and easily to the form of the wearer, thereby insuring the utmost comfort in its use, and meeting the requirements of the most fastidious taste, the improvement made by the said LYMAN consists, first, in so modifying the construction of the intermediate zone-like section of the Drucker corset as to provide it at its ends, both at front and back, with limbs, which extend out to the upper and lower edges of the corset, as seen in Figs. 1, 2, and 3, where A represents the zone-like section, and Q R and S T the respective limbs referred to. These limbs greatly improve the corset. If the upper limb at the back, as at R, be omitted, an important difference in the set of the corset over the shoulder-blades will be produced, as compared with the construction here described; and the addition of the front and back lower limbs materially aids the set of the corset over the hips. Second, in so constructing and arranging the broad front upper limb of each half of the corset that the rear portion $x$ of it, next to the seam $v$, shall have sufficient width and length to turn in somewhat at the upper part and side of the bosom of the wearer, thereby securing a very perfect and easy fit at that part of the body; while, at the same time, the main portion of the limb can be forked, as at $m$ $m$, so as to receive the gore-piece D, by which all the required fullness for the bosom is obtained. By these means all strain on the top and bottom of the corset is removed, and, when worn, it is caused to adjust itself to the form with great exactness and comfort. The upper section B may be so made, by having a long top edge, as to produce a slight fullness at the part by which it joins the front upper limb Q; and the lower section C is preferably cut in an elliptic shape, so as to give considerable fullness over the hip. The gore-piece D may be increased or diminished in width to suit busts of greater or less fullness without interfering with the cut of the other parts of the stay or corset; but care must be taken to retain the portion $x$ of the limb Q in order to insure the most perfect and easy fit over the bosom. When the various parts are sewed together, ribs of steel or whalebone may be applied to the corset, as usual, to give it a permanent set, as shown in Fig. 2.

It is found by experience that a corset made as here described will fit more perfectly and comfortably at all points, and can be worn by the most fastidious person with greater ease and satisfaction than any other heretofore known.

The putting a gore or gores into a corset, whether such corset be made according to the Drucker system or not, is, of course, not here claimed, as the use of gores in various classes of corsets has long been practiced; but Having thus made known the invention of the said LYMAN, what is claimed, and desired to be secured by Letters Patent, is—

The improved corset herein described, each half of which is composed of the upper and lower pieces or sections B and C, combined with the intermediate section A, having the limbs R S T, and the wide limb Q containing the portion $x$, the whole constructed, combined, and arranged substantially as described and shown.

WILLIAM S. THOMSON.
CHARLES H. LANGDON.
GEO. C. BATCHELLER.

Witnesses to signature of THOMSON:
JOSEF SOMLEITHNERZ,
P. E. LOCKWOOD.

Witnesses to signatures of LANGDON and BATCHELLER:
T. B. BEECHER,
TIMOTHY KANE.